United States Patent [19]

Matsufuji et al.

[11] Patent Number: 4,784,907
[45] Date of Patent: Nov. 15, 1988

[54] MAGNETIC RECORDING MEDIUM

[75] Inventors: Akihiro Matsufuji; Akira Kasuga; Shigeo Komine; Yasuyuki Yamada; Hajime Miyatsuka, all of Odawara, Japan

[73] Assignee: Fuji Photo Film Co., Ltd., Kanagawa, Japan

[21] Appl. No.: 944,068

[22] Filed: Dec. 22, 1986

[30] Foreign Application Priority Data

Dec. 20, 1985 [JP] Japan ............................... 60-288936

[51] Int. Cl.⁴ .............................................. G11B 5/702
[52] U.S. Cl. .................................. 428/328; 252/62.54; 427/128; 427/131; 428/329; 428/425.9; 428/522; 428/644; 428/695; 428/900
[58] Field of Search ............... 428/694, 695, 900, 522, 428/425.9, 328, 329; 427/128, 131; 252/62.54; 360/134–136

[56] References Cited

U.S. PATENT DOCUMENTS

| | | | |
|---|---|---|---|
| 4,407,901 | 10/1983 | Miyatsuka | 428/694 |
| 4,420,531 | 12/1983 | Tokuda | 428/329 |
| 4,431,712 | 2/1984 | Matsufuji | 428/900 |
| 4,465,736 | 8/1984 | Nishihara et al. | 428/332 |
| 4,521,486 | 6/1985 | Ninomiya | 428/900 |
| 4,571,364 | 2/1986 | Kasuga et al. | 428/900 |
| 4,594,174 | 6/1986 | Nakayama | 428/425.9 |
| 4,600,521 | 7/1986 | Nakamura | 428/694 |
| 4,615,949 | 10/1986 | Yoda | 428/328 |
| 4,659,626 | 4/1987 | Fukushima | 428/521 |
| 4,707,411 | 11/1987 | Nakayama | 428/900 |
| 4,716,077 | 12/1987 | Okita | 428/900 |

Primary Examiner—Ellis P. Robinson
Attorney, Agent, or Firm—Sughrue, Mion, Zinn, Macpeak & Seas

[57] ABSTRACT

In a magnetic recording medium such as a video tape comprising a nonmagnetic support and a magnetic recording layer provided on the support, said magnetic recording layer comprising a binder and a ferromagnetic powder dispersed therein, the improvement in which:

the magnetic recording layer comprises a fatty acid ester lubricant and a lubricant other than the fatty acid ester lubricant;

the binder is composed of a resin component comprising a resin containing a repeating unit which has a polar group and having a glass transition point of not lower than 50° C., and a resin containing a repeating unit which has a polar group and having a glass transition point of lower than 50° C; and at least one resin of the resins contains a repeating unit having a polar group such as $-SO_3M$, $-O-SO_3M$ or $-PO(OM')_2$, wherein M is hydrogen or an alkali metal atom, and M' is hydrogen, an alkali metal atom or a lower hydrocarbon group.

7 Claims, No Drawings

MAGNETIC RECORDING MEDIUM

BACKGROUND OF THE INVENTION

1. Field of the Invention

The present invention relates to a novel magnetic recording medium.

2. Description of Prior Arts

A magnetic recording medium basically comprises a nonmagnetic support and a magnetic recording layer provided on the support, and the magnetic recording layer generally comprises a binder and a ferromagnetic powder dispersed therein.

Recently, a demand for a higher density recording system has increased, and hence a ferromagnetic metal powder has been employed in place of a conventional metal oxide-type ferromagnetic powder such as $\gamma$—$Fe_2O_3$ and iron oxide-type ferromagnetic powder containing other component such as cobalt.

The ferromagnetic metal powder is known to afford recording of a higher density, as the powder size is more minimized.

As a binder for dispersing the ferromagnetic metal powder therein to form a magnetic recording layer, there has been widely employed a resin component comprising both of a vinyl chloride copolymer (e.g., a vinyl chloride/vinyl acetate/maleic anhydride copolymer) and a polyurethane resin in consideration of low hardness of the ferromagnetic metal powder. Employment of such combination as a binder affords to produce a magnetic recording layer highly improved in various properties (e.g., strength) required for a magnetic recording medium.

However, according to study of the present inventors, a ferromagnetic powder is poorly dispersed in the above-mentioned binder particularly in the case of using a minimized ferromagnetic powder. That is, in spite of using such minimized ferromagnetic powder, the resulting magnetic recording medium is not improved sufficiently in electromagnetic conversion characteristics, and some particles of the poorly dispersed ferromagnetic powder are easily dropped off from the recording medium in the running procedure. A portion of the particles dropping from the medium in the running procedure is apt to instantaneously adhere to a magnetic head, and in that instant, lowering of reproduction output (so-called instantaneous clogging on the head) occurs.

For enhancing the dispersibility of a ferromagnetic powder, it is known to incorporate a polar group into the binder so as to improve an affinity of the binder for the ferromagnetic powder.

For instance, Japanese patent publication No. 59(1984)-8127 discloses an invention relating to a magnetic recording medium using at least one of a vinyl chloride copolymer having a specific polar group and a polyurethane resin in combination with a polyurethane resin having a specific polar group as a binder for the purpose of enhancing the dispersibility of the ferromagnetic powder.

Although the employment of such a binder improves the dispersibility of a ferromagnetic powder, there is also brought about a problem, that is, the surface of the magnetic recording layer is highly smoothened owing to the well dispersibility of the ferromagnetic powder so as to excessively increase the friction coefficient of the resulting magnetic layer. Accordingly, it is required to lower the friction coefficient of such smooth surface of the magnetic recording layer for providing an excellent running property to the resulting magnetic recording medium. The above-mentioned publication also discloses an example of using a lubricant such as a silicone oil, but it has been confirmed by the present inventors that the effect by using such lubricant is not satisfactory.

SUMMARY OF THE INVENTION

It is an object of the present invention to provide a magnetic recording medium which is improved in the dispersibility of a ferromagnetic powder in a magnetic recording layer and shows a high running property.

There is provided by the present invention a magnetic recording medium comprising a nonmagnetic support and a magnetic recording layer provided on the support, said magnetic recording layer comprising a binder and a ferromagnetic powder dispersed therein, which is characterized in that:

said magnetic recording layer comprises a fatty acid ester lubricant and a lubricant other than the fatty acid ester lubricant;

said binder is composed of a resin component comprising a resin containing a repeating unit which has a polar group and having a glass transition point of not lower than 50° C., and a resin containing a repeating unit which has a polar group and having a glass transition point of lower than 50° C.; and at least one resin of said resins contains a repeating unit having at least one polar group selected from the group consisting of —$SO_3M$, —$OSO_3M$ and —$PO(OM')_2$, wherein M is hydrogen or an alkali metal atom, and M' is hydrogen, an alkali metal atom or a lower hydrocarbon group.

In the magnetic recording layer of the magnetic recording medium of the present invention, at least two kinds of resins incorporated with a polar group are used as a binder, and at least one of the resins contains the above-mentioned specific polar group. Accordingly, the dispersibility of the ferromagnetic powder in the magnetic recording layer is highly improved, and the surface of the magnetic recording layer is very smoothened.

Further, a fatty acid ester lubricant and a lubricant other than the fatty acid ester lubricant, both selected from lubricants conventionally employed, are used in combination as a lubricant in the magnetic recording medium of the invention, whereby prominently high lubricity can be obtained, and the friction coefficient of the surface of the recording layer can be lowered in spite of the extremely smooth surface. That is, the employment of a combination of those lubricants can afford to produce a magnetic recording medium having a magnetic recording layer of a low friction coefficient on its surface, as compared with a conventional magnetic recording medium using a lubricant such as dimethyl silicone or an olive oil.

DETAILED DESCRIPTION OF THE INVENTION

A magnetic recording medium of the invention basically comprises a nonmagnetic support and a magnetic recording layer provided on the support. The magnetic recording layer comprises a binder and a ferromagnetic metal powder dispersed therein.

As a material of the nonmagnetic support, there can be mentioned those conventionally employed. Examples of the nonmagnetic support material include synthetic resin films such as films of polyethylene terephthalate, polypropylene, polycarbonate, polyethylene naphthalate, polyamide, polyamideimide, and polyimide; and metallic foils such as aluminum foil and stainless steel foil. The thickness of the nonmagnetic support is generally in the range of from 3 to 50 μm, preferably in the range of from 5 to 30 μm.

The nonmagnetic support may have a back layer (or backing layer) on the opposite side of the side where a magnetic recording layer is to be coated.

The magnetic recording medium of the invention has the above-described nonmagnetic support coated thereupon with a magnetic recording layer comprising a ferromagnetic powder dispersed in a binder.

As a ferromagnetic powder employable in the invention, there can be mentioned those generally employed. Examples of the ferromagnetic powder include a ferromagnetic powder mainly containing iron, a metal oxide-type ferromagnetic powder such as a powder of γ—Fe$_2$O$_3$ or Fe$_3$O$_4$, and a modified metal oxide-type ferromagnetic powder such as a powder of Co-modified iron oxide, modified barium ferrite or modified strontium ferrite.

As a typical ferromagnetic metal powder, there can be mentioned a ferromagnetic alloy powder containing a metal component of at least 75 wt.% in which at least 80 wt.% of the metal component comprises at least one ferromagnetic metal or metal alloy (e.g., Fe, Co. Ni, Fe—Co, Fe—Ni, Co—Ni, Fe—Zn—Ni, or Co—Ni—Fe) and the remaining metal component, if present, comprises other atom(s) (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, or P). The ferromagnetic metal component may contain a small amount of water, hydroxide, or oxide. Processes for the preparation of those ferromagnetic metal powders are already known, and the ferromagnetic metal powder which is an example of the ferromagnetic powders employable in the invention can be prepared by the known processes.

Processes for the preparation of the metal oxide-type ferromagnetic powder or the modified metal oxide-type ferromagnetic powder are also known, and those processes can be applied to the preparation of a ferromagnetic powder employed in the invention.

There is no specific limitation on the shape of the ferromagnetic powder employable in the invention, but generally used is a ferromagnetic powder in a needle shape, grain shape, dice shape, rice shape or plate shape.

According to the present invention, the dispersibility of the minimized ferromagnetic metal powder in the magnetic recording layer can be effectively improved, so that the invention is specifically advantageously applied to a magnetic recording medium using a ferromagnetic metal powder having a specific surface area (S-BET) of not less than 45 m$^2$/g.

In the magnetic recording layer of the magnetic recording medium of the invention is contained a binder in an amount of 10–40 parts by weight, preferably 15–30 parts by weight, based on 100 parts by weight of the above-mentioned ferromagnetic powder.

The magnetic recording layer according to the invention is composed of a resin component containing a repeating unit having a polar group, and the resin component comprises a resin having a glass transition point of not lower than 50° C. (preferably not lower than 55° C.) and a resin having a glass transition point of lower than 50° C. (preferably lower than 45° C.).

Employment of the resin having a glass transition point of not lower than 50° C. can provide stiffness to the resulting magnetic recording layer, while employment of the resin having a glass transition point of lower than 50° C. can provide elasticity to the resulting magnetic recording layer. That is, a magnetic recording layer having higher strength can be obtained by using a combination of those resins having such properties.

As the resins having a glass transition point of not lower than 50° C., there can be mentioned those conventionally employed for a binder of a magnetic recording medium such as vinyl chloride copolymers, cellulose derivatives, and (meth)acrylic ester resins, which are incorporated with a polar group.

As the resins having a glass transition point of lower than 50° C., there can be mentioned those conventionally employed for a binder of a magnetic recording medium such as polyurethane resins and polyester resins, which are incorporated with a polar group.

In the present invention, it is particularly preferred to employ a vinyl chloride copolymer having a polar group in combination with a polyurethane resin having a polar group.

The above-mentioned resins generally vary in the glass transition point depending upon the difference of crystallinity thereof, etc., and hence the resin employed in the invention is selected based on its glass transition point. For instance, the glass transition point of a polyurethane resin or a polyester resin sometimes becomes not lower than 50° C. by varying the kind of monomers, reaction conditions, etc., employed in the synthesis of the resin. In this case, there can be employed a combination of two kinds of polyurethane resins having different glass transition points, a combination of two kinds of polyester resins having different glass transition points, or a combination of a polyurethane resin and a polyester resin having different glass transition points, in consideration of the glass transition point of the resulting mixture.

The resin employable for the magnetic recording layer is a resin containing a repeating unit having a specific polar group, as well as having the abovementioned glass transition point.

The resin containing a repeating unit having a specific polar group is described below, referring to an example of the invention using a combination of a vinyl chloride copolymer and a polyurethane resin as a resin component.

The polar group is selected from —SO$_3$M, —OSO$_3$M and —PO(OM')$_2$, in which M and M' have the meanings as defined hereinbefore, and the resin may contain a repeating unit having the polar group singly or in combination. However, the repeating unit having the above-mentioned specific polar group should be contained in at least one of the vinyl chloride copolymer and the polyurethane resin.

In more detail, there are three cases in the invention, that is, the vinyl chloride copolymer contains a repeating unit having the above-mentioned specific polar group and the polyurethane resin contains a repeating unit having other polar group; both of the vinyl chloride copolymer and the polyurethane resin contain a repeating unit having the above-mentioned specific polar group; and the vinyl chloride copolymer contains a repeating unit having other polar group and the polyurethane resin contains a repeating unit having the above-mentioned specific polar group.

In the invention, preferred is that at least one of the vinyl chloride copolymer and the polyurethane resin contains a repeating unit having —SO₃Na, and more preferred is that both thereof contain the repeating unit having —SO₃Na. In the case of using a resin component containing a repeating unit having —SO₃Na as described above, the ferromagnetic powder can be well dispersed in the magnetic recording layer, and particularly in the case of incorporating a repeating unit having —SO₃Na into both of the copolymer and the polyurethane resin, the ferromagnetic powder can be most highly dispersed in the recording layer.

When the vinyl chloride copolymer contains a repeating unit having the specific polar group, the amount of the repeating unit is generally in the range of 0.01 to 5.0 mol%, preferably 0.5 to 3.0 mol%. When the amount thereof is less than 0.01 mol%, the ferromagnetic powder is liable to be poorly dispersed in the recording layer. When the amount thereof exceeds 5.0 mol%, the vinyl chloride copolymer becomes hygroscopic, whereby the resulting medium decreases in the weathering resistance.

The above-described vinyl chloride copolymer generally has a number-average molecular weight ranging from 15,000 to 60,000.

The vinyl chloride copolymer is preferably incorporated with an epoxy group. Incorporation of the epoxy group can enhance the stability of the vinyl chloride copolymer. A repeating unit having the epoxy group is generally contained in the vinyl chloride copolymer in an amount of 1 to 30 mol%, preferably 1 to 20 mol%.

When the polyurethane resin contains a repeating unit having the above-mentioned polar group, the amount of the repeating unit is generally in the range of 0.01 to 5.0 mol%, preferably 0.5 to 2.0 mol%.

The polyurethane resin generally has a number-average molecular weight ranging from 10,000 to 200,000, preferably from 15,000 to 60,000.

The ratio between the vinyl chloride copolymer and the polyurethane resin is generally in the range of 85:15 10:90, preferably 70:30 to 30:70, (vinyl chloride copolymer:polyurethane resin, by weight).

The vinyl chloride copolymer or the polyurethane resin may contain other polar groups than the above-described specific polar group. Examples of other polar group include —COOH, —OH and —CN, which can be introduced into a resin generally employed for a magnetic recording medium and afford to enhance an affinity of the resin for the ferromagnetic powder.

The above-described vinyl chloride copolymer can be prepared, for instance, by the following process.

In the case of preparing a vinyl chloride copolymer incorporated with a polar group of —SO₃Na, sodium 2-(meth)acrylamido-2-methylpropanesulfonate having a reactive double bond and —SO₃Na as a polar group (monomer having a reactive double bond and a polar group) and vinyl chloride are polymerized under a pressure at a temperature of not higher than 100° C.

As examples of the monomer having a reactive double bond and a polar group employable for introducing a polar group in the above method, there can be mentioned 2-(meth)acrylamido-2-methylpropanesulfonic acid, vinyl sulfonic acid, sodium salt or potassium salt thereof, ethylester of (meth)acrylic acid-2-sulfonic acid, sodium salt or potassium salt thereof, and ethylester of (meth)acrylic acid-2-phosphonic acid, as well as the above-mentioned sodium 2-(meth)acrylamido-2-methylpropanesulfonate.

For introducing an epoxy group, a monomer such as glycidyl acrylate is generally employed in the above reaction system to carry out a polymerization reaction.

A method for incorporating a polar group into a vinyl chloride copolymer employable in the invention is by no means restricted to the above-described one, and other methods can be also employed. For instance, vinyl chloride and vinyl alcohol are subjected to a polymerization reaction to produce a vinyl chloride copolymer having a polyfunctional base, —OH, and thus produced copolymer is caused to react with a compound containing the following polar groups and chlorine (i.e., dehydrochlorination reaction), to incorporate a polar group into the copolymer.

Examples of the polar groups employable in the above method are as follows:

ClCH₂CH₂SO₃M;

ClCH₂CH₂OSO₃M; and

ClCH₂PO(OM')₂;

in which M and M' have the meanings as defined hereinbefore.

For introducing other polar groups into the vinyl chloride copolymer, the following monomers are generally co-polymerized with the above-mentioned components. Examples of the monomers employable for introducing other polar groups include (meth)acrylic acid, maleic anhydride, unsaturated nitrile such as (meth)acrilonitrile, and vinyl alcohol.

The vinyl chloride copolymer employed in the present invention may contain other monomers than the above-mentioned monomer. Examples of other monomers include vinyl ethers (e.g., methyl vinyl ether, isobutyl vinyl ether and lauryl vinyl ether), α-monoolefins (e.g., ethylene and propylene), acrylic acid esters (e.g., methyl(meth)acrylate and (meth)acrylic acid ester containing a functional group such as hydroxyethyl(meth)acrylate), aromatic vinyl (e.g., styrene and α-methyl styrene), and vinyl esters (e.g., vinyl acetate and vinyl propionate).

The methods for incorporating a polar group into a vinyl chloride copolymer is described in Japanese patent provisional publications No. 57(1982)-44227, No. 58(1983)-108032, No. 59-(1984)-8127 and No. 60(1985)-101161, etc., and those methods can be also utilized in the present invention.

A polyurethane resin can be prepared, for instance, by the following process.

A polyurethane resin is generally produced by reaction of a polyisocyanate compound with a polyol component. As the polyol component, there is generally used polyester polyol which is produced by a reaction of polyol with a polybasic acid.

The above-described conventional process can be applied to the preparation of a polyurethane resin having the specific polar group employable in the invention. In more detail, a polybasic acid having a specific polar group as a portion of the polybasic acid is used to prepare polyester polyol, and the obtained polyester polyol is caused to react with a polyisocyanate compound to prepare a polyurethane resin.

Examples of the polybasic acid having a polar group include 5-sulfoisophthalic acid, 2-sulfoisophthalic acid, 4-sulfophthalic acid, 3-sulfophthalic acid, dialkyl 5-sulfoisophthalate, dialkyl 2-sulfoisophthalate, alkyl 4-sulfophthalate, alkyl 3-sulfophthalate, sodium salts thereof, and potassium salts thereof.

The above-mentioned reaction is already known, and the polyurethane resin employable in the invention can be prepared by utilizing the known reaction.

Examples of the polyol component employable in the invention include trimethylolpropane, hexanetriol, glycerol, trimethylolethane, neopentyl glycol, pentaerythritol, ethylene glycol, propylene glycol, butylene glycol and diethylene glycol.

Examples of dicarboxylic acid among the polybasic acids include phthalic acid, isophthalic acid, terephthalic acid, adipic acid, dimerized linolenic acid, sebacic acid, and maleic acid.

The polyester polyol having a specific polar group obtained as above generally has a number-average molecular weight ranging from 500 to 8,000.

Examples of the polyisocyanate compound include a reaction product of 3 moles of diisocyanate (e.g., diphenylmethane-4,4'-diisocyanate, tolylene diisocyanate, or xylylene diisocyanate) and 1 mol of trimethylolpropane, a buret adduct compound of 3 moles of hexamethylene diisocyanate, an isocyanurate compound of 5 moles of tolylene diisocyanate, an isocyanurate adduct compound of 3 moles of tolylene diisocyanate and 2 moles of hexamethylene diisocyanate, and a polymer of diphenylmethane diisocyanate.

A polyurethane resin incorporated with other polar groups employable in the invention can be also prepared in the conventional manner.

A method for incorporating a polar group into the polyurethane resin employable in the invention is by no means restricted to the above-described one, and other methods can be also employed. For instance, a polyurethane resin incorporated with a polyfunctional base, —OH, is first produced, and the polyurethane resin is caused to react with a compound containing the following polar groups and chlorine (i.e., dehydrochlorination reaction), to incorporate a polar group into the polyurethane resin.

Examples of the polar groups employable in the above method are as follows:

$ClCH_2CH_2SO_3M$;
$ClCH_2CH_2OSO_3M$; and
$ClCH_2PO(OM')_2$;

in which M and M' have the same meanings as defined hereinbefore.

The methods for incorporation of a polar group into a polyurethane resin is described in Japanese patent publications No. 54(1979)-157603 and No. 58(1983)-41565, and Japanese patent provisional publications No. 57(1982)-92422 and No. 57(1982)-92423, and those methods can be also utilized in the present invention.

The binder employable in the invention can contain the following resin components other than the above-described vinyl chloride copolymer and the polyurethane resin in an amount of not larger than 20% by weight of the whole amount of the binder. Examples of the resins employable in combination include vinyl chloride/vinyl acetate copolymers; copolymers of vinyl chloride/vinyl acetate, vinyl alcohol, maleic acid and-/or acrylic acid; vinyldene chloride/vinyl chloride copolymers; vinyl chloride/acrylonitrile copolymers, ethylene/vinyl acetate copolymers; cellulose derivatives such as nitrocellulose resins; acrylic resins; polyvinyl acetal resin; polyvinyl butyral resin; epoxy resin; and phenoxy resin.

A polyisocyanate compound can be further added in the preparation of a magnetic recording layer of the recording medium of the invention. In this case, the same polyisocyanate compound as that used in the preparation of the polyurethane resin can be employed.

In the magnetic recording medium of the invention, by employing the aforementioned resin component having a specific polar group to prepare a magnetic recording layer, the affinity of the resin component for the ferromagnetic powder can be enhanced, and hence the ferromagnetic powder can be well dispersed in the resulting magnetic recording layer. Accordingly, a squareness ratio of the magnetic recording layer increases to show high electromagnetic conversion characteristics. Further, since agglomerates of the ferromagnetic powder are less produced in the recording layer, the ferromagnetic powder hardly drops off from the recording layer, so that occurrence of instantaneous clogging on a magnetic head can be prominently reduced.

Further, two kinds of resins having different glass transition points are used as a binder to produce a magnetic recording layer of higher strength, and hence the resulting recording layer is prevented from suffering damages in the running procedure.

The magnetic recording medium of the invention contains a fatty acid ester lubricant and a lubricant other than the fatty acid ester lubricant in the magnetic recording layer.

The fatty acid ester lubricant employable in the invention is generally esters of a fatty acid having 12–22 carbon atoms (preferably 16–22 carbon atoms) and a fatty alcohol having 2–18 carbon atoms (preferably 3–10 carbon atoms). Preferred are butyl stearate, butyl palmitate, amyl stearate and amyl palmitate.

Examples of the lubricant other than the fatty acid ester lubricant employable in combination with the fatty acid ester lubricant include a fatty acid lubricant, a silicone lubricant, and a fatty acid modified silicone lubricant. These lubricants can be employed singly or in combination.

In the case of using a fatty acid lubricant as the lubricant other than the fatty acid ester lubricant, a fatty acid having 12–22 carbon atoms, preferably 16–22 carbon atoms, is generally employed. Preferably employed as the fatty acid lubricant are stearic acid, palmitic acid and behenic acid.

In the case of using a silicone lubricant as the lubricant other than the fatty acid ester lubricant, a silicone lubricant having a molecular weight of not less than 1,000 is generally employed in the invention.

A fatty acid modified silicone lubricant mainly contains a compound having dimethyl cyloxane structure which is incorporated with a fatty acid in a portion of side chain thereof through ester bonding. In the case of using such fatty acid modified silicone compound, a fatty acid modified silicone compound having a molecular weight of not less than 1,000 is generally employed.

In the present invention, it is particularly preferred to employ a fatty acid ester lubricant in combination with a fatty acid lubricant.

The whole amount of the fatty acid ester lubricant and the lubricant other than the fatty acid ester lubricant in the magnetic recording layer is in the range of 0.1 to 10 parts by weight, preferably 1 to 5 parts by weight, based on 100 parts by weight of the ferromagnetic powder.

When the amount of the lubricant is less than 0.1 parts by weight, the resulting recording layer cannot be provided with sufficient lubricity. When the amount thereof exceeds 10 parts by weight, the surface of the recording layer excessively contains the lubricant, whereby dust is liable to deposit to the surface.

The ratio between the fatty acid ester lubricant and the lubricant other than the fatty acid ester lubricant in the magnetic recording layer is generally in the range of from 1:9 to 9:1 (fatty acid ester lubricant:lubricant other than the fatty acid ester lubricant), by weight.

When the ratio of the lubricant other than the fatty acid ester lubricant to the fatty acid ester lubricant is lower than the above-defined lowest limit, the running endurance of the resulting magnetic recording medium is apt to be unsatisfactory in the high-speed running. When the ratio of the fatty acid ester lubricant to the lubricant other than the fatty acid ester lubricant is lower than the above-defined lowest limit, the running property of the resulting magnetic recording medium is apt to be unsatisfactory in the normal-speed running (e.g., so-called "stick-slip" phenomenon occurs).

Employment of the aforementioned resin component can generally afford to enhance dispersibility of the ferromagnetic powder in the magnetic recording layer, whereby the surface of the recording layer is very smoothened, and hence the surface thereof shows a high friction coefficient. For this reason, a magnetic recording medium having the satisfactory running property can be hardly obtained by using only a conventionally used lubricant such as a fatty acid, a fatty acid ester, a silicone compound (e.g., dimethyl silicone), and an animal or vegetable oil (e.g., olive oil or squalane). For example, in the case of using a fatty acid singly, the fatty acid hardly serves as a lubricant when a magnetic recording medium runs in contact with a magnetic head at an extremely high speed (e.g., a case of a video tape under a still mode in a running procedure). In the case of using a fatty acid ester, an animal or vegetable oil, or a silicone compound, the friction coefficient of the surface of the magnetic recording layer cannot be reduced sufficiently. In addition, in the case of a video tape, the so-called "stick-slip" phenomenon (namely, the tape sticks to a running system of a recording and reproducing device and slips in the normal-speed running procedure) is brought about, whereby the stable running of the video tape can be hardly obtained.

On the contrary, the magnetic recording medium of the invention employs a fatty acid ester lubricant in combination with a lubricant other than the fatty acid ester lubricant, so that the friction coefficient of the surface of the magnetic recording layer is prominently reduced. For instance, the friction coefficient of the recording layer according to the invention is not higher than ⅔, as compared with the case of using any one of a fatty acid ester, an animal oil, a vegetable oil and a silicone compound, singly, in the same amount. Further, even if the magnetic recording layer is brought into contact with a magnetic head, etc. in a recording and reproducing device at an extremely high speed (for example, a case of video tape under a still mode), the recording layer shows high lubricity and the surface thereof is less damaged. In addition to those advantages, the magnetic recording medium is free from the stick-slip phenomenon, and hence stable running can be obtained in the recording medium.

The fatty acid ester lubricant and the fatty acid lubricant among the lubricants employed in the invention serve as a dispersing agent for the ferromagnetic powder in the preparation of a magnetic recording layer, so that a squareness ratio of the resulting magnetic recording layer increases, and hence electromagnetic conversion characteristics of the recording medium can be enhanced.

The magnetic recording medium of the present invention preferably contains an abrasive in the recording layer. There is no specific limitation on the abrasive employable in the invention, and the abrasive can be selected from those generally employed. The amount of the abrasive is generally in the range of 0.2 to 10 parts by weight based on 100 parts by weight of the ferromagnetic powder.

The magnetic recording layer preferably contains other additives such as carbon black having a conductivity.

The process for the preparation of a magnetic recording medium of the present invention is described below.

In the first place, the above-mentioned ferromagnetic powder, resin component and lubricant (and an abrasive or a filler, if necessary) are kneaded with a solvent to prepare a magnetic paint. The solvent used in the kneading procedure can be selected from those generally employed in the preparation of a magnetic paint. Kneading of those components can be carried out according to the conventional manner, and the order of addition of those components can be appropriately determined.

Other known additives such as a dispersing agent and an antistatic agent can be added in the preparation of a magnetic paint.

In the second place, the magnetic paint prepared as above is applied to the aforementioned nonmagnetic support. The magnetic paint can be coated directly on the nonmagnetic support, but it is possible to provide an adhesive layer to combine the magnetic paint layer with the nonmagnetic support.

The magnetic recording layer has a thickness (after dryness) generally of 0.5 to 10 μm, preferably of 1.5 to 7.0 μm.

The magnetic recording layer provided on the nonmagnetic support is generally subjected to a treatment of orienting the ferromagnetic powder contained in the magnetic recording layer, that is, a magnetic orientation, and then subjected to a drying process. The dried magnetic recording layer is generally heated to cure the resin component in the layer, and then, if necessary, subjected to a surface smoothening process. The magnetic recording medium having been subjected to these processes such as the smoothening process is subjected to a blading treatment as desired, and then cut to give a medium having a desired shape.

The examples and the comparison examples of the present invention are given below. In the following examples, the expression "part(s)" means "part(s) by weight", otherwise specified.

EXAMPLE 1

The components indicated below were kneaded in a ball mill for 48 hours to give a homogeneous dispersion.

| | |
|---|---|
| Ferromagnetic metal alloy powder (Fe—Zn—Ni alloy, Fe: 92 wt. %, Zn: 4 wt. %, Ni: 4 wt. %, specific surface area: 52.5 m²/g, Hc: 1,530 Oe, saturation magnetic moment: 120 emu/g.) | 100 parts |
| Vinyl chloride copolymer | 12 parts |
| Polyurethane resin | 5 parts |

| -continued | |
|---|---|
| α-Al$_2$O$_3$ (mean particle size: 0.3 μm) | 5 parts |
| Stearic acid | 2 parts |
| Butyl stearate | 2 parts |
| Methyl ethyl ketone | 300 parts |
| Methyl isobutyl ketone | 50 parts |

The above-described vinyl chloride copolymer was a vinyl chloride/vinyl acetate/maleic anhydride copolymer (400×110A, polymerization degree: 400, glass transition point: 75° C.; available from Nippon Geon Co., Ltd, Japan).

The above-described polyurethane resin was prepared by the following process.

Polyurethane Resin

Into a reactor equipped with a thermometer, a stirrer and a partial reflux condenser were introduced 582 g. of dimethyl terephthalate, 157 g, of dimethyl 5-sodium sulfoisophthalate, 434 g. of ethylene glycol, 728 g. of neopentyl glycol, 0.66 g. of zinc acetate and 0.08 g. of sodium acetate, to perform a reaction at 220° C. for 2 hours. To the reaction product in the reactor was further added 1,212 g. of sebacic acid to carry out a reaction for 2 hours. Then the pressure of the reaction system was reduced to 20 mmHg for 30 min., and the polymerization reaction was carried out at a pressure of 5-20 mmHg and a temperature of 250° C. for 50 min. to produce polyester polyol.

In the obtained polyester polyol, terephthalic acid, dimethyl 5-sodium sulfoisophthalate, sebacic acid, ethylene glycol and neopentyl glycol bonded to each other in a molar ratio of 15.3:2.9:30.7:22.5:28.6 (terephthalic acid:dimethyl 5-sodium sulfoisophthalate:sebacic acid::ethylene glycol:neopentyl glycol).

Into the same reactor as described above were introduced 1,000 g. of the polyester polyol obtained above, 1,280 g. of toluene, 850 g. of methyl isobutyl ketone, 71 g. of diphenylmethane diisocyanate and 1.2 g. of dibutyl tin dilaurate, to perform a reaction at a temperature of 70°–90° C. for 8 hours so as to produce a polyurethane resin. In the obtained polyurethane resin, dimethyl 5-sodium sulfoisophthalate was polymerized in an amount of 0.25 mol%. The obtained polyurethane resin had a glass transition point of 20° C.

The aforementioned dispersion was filtered over a filter having mean pore size of 1 μm to give a magnetic paint. The magnetic paint was coated over a polyethylene terephthalate support (thickness: 10 μm) to give a coated layer of a thickness of 3.0 μm (thickness in dry state) by means of a reverse roll. The nonmagnetic support with the coated layer was treated with an electromagnet at 3,000 gauss under wet condition to give a magnetic orientation. After the coated layer was dried, the dried layer was subjected to supercalendering, heat treatment and blading treatment. The resulting sheet was slit into width of 8 mm to prepare an 8 mm type video tape.

The obtained video tape was evaluated on a glossiness of the surface of the magnetic recording layer, a squareness ratio, still life, and a friction coefficient (μ) of the magnetic recording layer according to the following tests. The results are set forth in Table 1.

(1) Surface glossiness

The measurement of the glossiness was done based on JIS-Z-8741 at an angle of incidence of 45°. The values set forth in Table 1 were relative values in the case of a specular glossiness of a glass surface at a refractive index of 1.567 being 100%.

(2) Squareness ratio

The measurement of the squareness ratio was done by measuring Br/Bm at Hm at 5 kOe by means of a vibrating sample magnetic flux measuring machine (produced by Toei Industries Co., Lid.).

(3) Still life

Still life of the video tape was examined by running the tape under a still mode, to determine a term (i.e., still life) at the end of which the reproduced video image turned to ⅓ of the initial video image. Still life of not shorter than 60 min. means that more than ⅓ of the initial video image remains even after the running of the video tape for 60 min. under a still mode.

(4) Friction coefficient of the magnetic recording layer-surface

The surface of the magnetic recording layer of the video tape was brought into contact with a stainless pole having an average surface roughness of 0.15 μm and a diameter of 5 mm in atmosphere of 25° C. and 65 %RH, and the video tape was subjected to running at a rate of 1.4 cm/min with a pending weight of 20 g., to measure a friction coefficient of the surface of the magnetic recording layer.

EXAMPLE 2

The procedure of Example 1 was repeated except for using a vinyl chloride copolymer prepared by the following process instead of the vinyl chloride/vinyl acetate/maleic anhydride copolymer, to prepare a video tape.

Vinyl chloride copolymer

Into a 500-ml stainless autoclave equipped with a magnetic induction stirrer and a pressure indicator were introduced 300 ml of nitrogen-substituted distilled water dissolving 0.6 g. of polyvinyl alcohol, 0.15 g. of azobisisobutyronitrile, 17.0 g. of vinyl acetate and 8.0 g. of sodium 2-acrylamido-2-methylpropanesulfonate, and the autoclave is covered with a lid. The autoclave is then allowed to cool in a dry ice-methanol bath to lower a temperature within the autoclave to −20° C.

Subsequently, the autoclave was charged with nitrogen gas to substitute a gas in the autoclave by the nitrogen gas, and then rapidly introduced 100 g. of a cooled liquid vinyl chloride. The components in the autoclave were stirred for approx. 15 min. at elevating temperature inside the autoclave to 60° C. to perform a polymerization reaction.

All of the reactive components in the autoclave were consumed to lower the pressure inside the autoclave so as to complete the polymerization reaction.

After lowering of the pressure, the autoclave was cooled to room temperature, and nitrogen was introduced into the autoclave to remove the remaining vinyl chloride. The obtained product was taken out of the autoclave. The product was then sufficiently washed with water and filtered to obtain a white powder of the polymerization product. The polymerization product was then dried under vacuum at 40° C. for 12 hours.

As a result of elemental analysis of the obtained polymerized product, it was confirmed that vinyl chloride, sodium 2-acrylamido-2-methylpropanesulfonate and vinyl acetate were polymerized in a molar ratio of 87.5:2.5:10 (vinyl chloride:sodium 2-acrylamido-2-methylpropanesulfonate:vinyl acetate).

The obtained vinyl chloride copolymer was measured on an intrinsic viscosity [η] by the use of methyl ethyl ketone, and a glass transition point. The intrinsic viscosity thereof [η] in methyl ethyl ketone was 0.21, and the glass transition point was 65° C.

The obtained video tape was evaluated on a glossiness of the surface of the magnetic recording layer, a squareness ratio, still life, and a friction coefficient (μ) of the surface of the magnetic recording layer according to the above-described tests. The results are set forth in Table 1.

EXAMPLE 3

The procedure of Example 1 was repeated except for using amyl stearate in the same amount instead of butyl stearate, to prepare a video tape.

The obtained video tape was evaluated on a glossiness of the surface of the magnetic recording layer, a squareness ratio, still life, and a friction coefficient (μ) of the surface of the magnetic recording layer according to the above-described tests. The results are set forth in Table 1.

EXAMPLE 4

The procedure of Example 1 was repeated except for using 50 g. of mellitic anhydride instead of 157 g. of dimethyl 5-sodiumsulfoisophthalate to prepare a polyurethane resin (glass transition point: 25° C.).

Using the polyurethane resin, a magnetic recording medium (video tape) was prepared in the same manner as described in Example 1.

The obtained video tape was evaluated on a glossiness of the surface of the magnetic recording layer, a squareness ratio, still life, and a friction coefficient (μ) of the surface of the magnetic recording layer according to the above-described tests. The results are set forth in Table 1.

COMPARISON EXAMPLE 1

The procedure of Example 2 was repeated except for not using butyl stearate to prepare a video tape.

The obtained video tape was evaluated on a glossiness of the surface of the magnetic recording layer, a squareness ratio, still life, and a friction coefficient (μ) of the surface of the magnetic recording layer according to the above-described tests. The results are set forth in Table 1.

COMPARISON EXAMPLE 2

The procedure of Example 1 was repeated except for not using stearic acid to prepare a video tape.

The obtained video tape was evaluated on a glossiness of the surface of the magnetic recording layer, a squareness ratio, still life, and a friction coefficient (μ) of the surface of the magnetic recording layer according to the above-described tests. The results are set forth in Table 1.

COMPARISON EXAMPLE 3

The procedure of Example 1 was repeated except for using 4 parts of olive oil instead of stearic acid and butyl stearate to prepare a video tape.

The obtained video tape was evaluated on a glossiness of the surface of the magnetic recording layer, a squareness ratio, still life, and a friction coefficient (μ) of the surface of the magnetic recording layer according to the above-described tests. The results are set forth in Table 1.

COMPARISON EXAMPLE 4

The procedure of Example 1 was repeated except for using 4 parts of dimethyl silicone instead of stearic acid and butyl stearate to prepare a video tape.

The obtained video tape was evaluated on a glossiness of the surface of the magnetic recording layer, a squareness ratio, still life, and a friction coefficient (μ) of the surface of the magnetic recording layer according to the above-described tests. The results are set forth in Table 1.

TABLE 1

| | Glossiness (%) | Squareness Ratio | Still life (min.) | Friction Coefficient (μ) |
|---|---|---|---|---|
| Example 1 | 98 | 0.84 | not less than 60 | 0.23 |
| Example 2 | 100 | 0.85 | not less than 60 | 0.22 |
| Example 3 | 100 | 0.85 | not less than 60 | 0.22 |
| Example 4 | 94 | 0.83 | not less than 60 | 0.26 |
| Com. Example 1 | 100 | 0.84 | 0*[1] | 0.22 |
| Com. Example 2 | 95 | 0.83 | not less than 60 | 0.40 |
| Com. Example 3 | 90 | 0.82 | not less than 60 | 0.35 |
| Com. Example 4 | 90 | 0.82 | 10 | 0.35 |

*[1]"Still life of 0 min." means that the reproduction video image turned to not more than ½ of the initial video image immediately after the running of the video tape under a still mode was started. That is, the employed lubricant (i.e., stearic acid) did not substantially serve as a lubricant when the video tape run in contact with a magnetic head at a high speed by means of high-speed revolution of the magnetic head (generally 5–6 m/sec. in terms of tape running speed).

I claim:

1. A magnetic recording medium comprising a nonmagnetic support and a magnetic recording layer provided on the support, said magnetic recording layer comprising a binder and a ferromagnetic powder dispersed therein, which is characterized in that:

said magnetic recording layer comprises a fatty acid ester lubricant and a lubricant other than the fatty acid ester lubricant;

said binder is composed of a resin component comprising a vinyl chloride copolymer resin containing a repeating unit which has a polar group and having a glass transition point of not lower than 50° C. and a polyurethane resin containing a repeating unit which has a polar group and having a glass transition point of lower than 50° C., a ratio by weight of said vinyl chloride copolymer resin to said polyurethane resin being in the range of 70/30 to 30/70; and at least one resin of said resins contains a repeating unit having at least one polar group selected from the group consisting of —SO$_3$M, —OSO$_3$M and —PO(OM')$_2$, wherein M is hydrogen or an alkali metal atom, and M' is hydrogen, an alkali metal atom or a lower hydrocarbon group.

2. The magnetic recording medium as claimed in claim 1, wherein said ferromagnetic powder is a ferromagnetic metal powder having a specific surface area of not less than 45 m$^2$/g.

3. The magnetic recording medium as claimed in claim 1, wherein said vinyl chloride copolymer contains a repeating unit having —SO$_3$Na in an amount ranging from 0.01 to 5 mol%.

4. The magnetic recording medium as claimed in claim 1, wherein said polyurethane resin contains a repeating unit having —SO$_3$Na in an amount ranging from 0.01 to 5 mol%.

5. The magnetic recording medium as claimed in claim 1, wherein said fatty acid ester lubricant is an ester of a fatty acid having 12-22 carbon atoms and a fatty alcohol having 2-18 carbon atoms.

6. The magnetic recording medium as claimed in claim 1, wherein said lubricant other than the fatty acid ester lubricant is at least one lubricant selected from the group consisting of a fatty acid lubricant, a silicone lubricant and a fatty acid modified silicone lubricant.

7. The magnetic recording medium as claimed in claim 1, wherein a total amount of the fatty acid ester lubricant and the lubricant other than the fatty acid ester lubricant in the magnetic recording layer is in the range of 0.1 to 10 parts by weight based on 100 parts by weight of the ferromagnetic powder, and the ratio between the fatty acid ester lubricant and the lubricant other than the fatty acid ester lubricant is in the range of 1:9 to 9:1, by weight.

* * * * *